(12) United States Patent
Martin (10) Patent No.: US 10,728,585 B2
(45) Date of Patent: Jul. 28, 2020

(54) SYSTEM AND METHOD FOR DISTRIBUTED VIDEO STORAGE ACROSS ENTERPRISES

(71) Applicant: Sensormatic Electronics, LLC, Boca Raton, FL (US)

(72) Inventor: Walter A. Martin, Ballymena (GB)

(73) Assignee: Sensormatic Electronics, LLC, Boca Raton, FL (US)

(*) Notice: Subject to any disclaimer, the term of this patent is extended or adjusted under 35 U.S.C. 154(b) by 64 days.

(21) Appl. No.: 15/196,585

(22) Filed: Jun. 29, 2016

(65) Prior Publication Data

US 2017/0006313 A1    Jan. 5, 2017

Related U.S. Application Data

(60) Provisional application No. 62/186,938, filed on Jun. 30, 2015.

(51) Int. Cl.
| | |
|---|---|
| *H04N 21/218* | (2011.01) |
| *H04N 21/2743* | (2011.01) |
| *H04N 21/4223* | (2011.01) |
| *H04N 21/2347* | (2011.01) |
| *H04N 21/266* | (2011.01) |
| *H04N 7/18* | (2006.01) |
| *G08B 13/196* | (2006.01) |
| *G11B 27/11* | (2006.01) |
| *G11B 27/32* | (2006.01) |

(52) U.S. Cl.
CPC ... *H04N 21/2181* (2013.01); *G08B 13/19676* (2013.01); *G11B 27/11* (2013.01); *G11B 27/322* (2013.01); *H04N 7/181* (2013.01); *H04N 21/2347* (2013.01); *H04N 21/26613* (2013.01); *H04N 21/2743* (2013.01); *H04N 21/4223* (2013.01)

(58) Field of Classification Search
CPC ............... H04N 21/2181; H04N 7/181; H04N 21/2347; H04N 21/26613; H04N 21/2743; H04N 21/4223; G08B 13/19676; G11B 27/10
See application file for complete search history.

(56) References Cited

U.S. PATENT DOCUMENTS

| | | | | |
|---|---|---|---|---|
| 2003/0145038 | A1* | 7/2003 | Bin Tariq | H04L 65/4084 709/202 |
| 2007/0005694 | A1* | 1/2007 | Popkin | H04L 12/1859 709/204 |
| 2008/0199155 | A1* | 8/2008 | Hagens | H04N 7/141 386/291 |
| 2009/0158325 | A1* | 6/2009 | Johnson | H04N 7/17318 725/38 |
| 2009/0288424 | A1* | 11/2009 | Leblond | F25B 21/02 62/3.3 |

(Continued)

*Primary Examiner* — Thai Q Tran
*Assistant Examiner* — Sunghyoun Park
(74) *Attorney, Agent, or Firm* — HoustonHogle LLP (57) ABSTRACT

A system and method for storing image information, such as video clips, across multiple storage devices of different business entities provides redundancy and off-site storage, but possibly without the costs associated with a traditional cloud storage system. In examples, a peer-to-peer arrangement is used. A user/customer accesses the image information via a web portal hosted by their business entity or the operator of the system or accesses the image information from a mobile device.

17 Claims, 6 Drawing Sheets

(56) References Cited

U.S. PATENT DOCUMENTS

| | | | |
|---|---|---|---|
| 2010/0153770 A1* | 6/2010 | Lee | G08B 13/19656 |
| | | | 714/4.1 |
| 2011/0126258 A1* | 5/2011 | Emerson | H04L 51/04 |
| | | | 725/133 |
| 2013/0159648 A1* | 6/2013 | Anglin | G06F 11/1453 |
| | | | 711/162 |
| 2014/0101781 A1* | 4/2014 | Bouknight | G06F 21/10 |
| | | | 726/28 |
| 2015/0089028 A1* | 3/2015 | Zheng | H04W 28/00 |
| | | | 709/219 |
| 2015/0288933 A1* | 10/2015 | Iversen | G06F 3/147 |
| | | | 348/14.07 |
| 2015/0296260 A1* | 10/2015 | van Coppenolle | |
| | | | H04N 21/4334 |
| | | | 725/31 |

* cited by examiner

| storage index 112 | | stored locally | redundant location 1 | redundant location 2 | redundant location 3 |
|---|---|---|---|---|---|
| Customer 1 | video clip 1<br>video clip 2<br>video clip 3<br>video clip 4<br>. . . | device 1A<br>device 1A<br>none<br>device 1C<br>. . . | device 2A<br>device 2A<br>device 3A<br>device 3A<br>. . . | device 4A<br>device 4A<br>device 4A<br>device 4A<br>. . . | N/A<br>N/A<br>N/A<br>N/A<br>. . . |
| Customer 2 | video clip 1<br>video clip 2<br>video clip 3<br>video clip 4<br>. . . | device 2A<br>device 2A<br>device 2B<br>device 2A<br>. . . | device 1A<br>device 1A<br>device 1A<br>device 1A<br>. . . | N/A<br>N/A<br>N/A<br>N/A<br>. . . | N/A<br>N/A<br>N/A<br>N/A<br>. . . |
| Customer 3 | video clip 1<br>video clip 2<br>video clip 3<br>video clip 4<br>. . . | device 3A<br>device 3A<br>device 3A<br>device 3A<br>. . . | device 2A<br>device 2A<br>device 2A<br>device 2A<br>. . . | device 1C<br>device 1C<br>device 1C<br>device 1C<br>. . . | device 3C<br>device 3C<br>device 3C<br>device 3C<br>. . . |
| Customer 4 | video clip 1<br>video clip 2<br>video clip 3<br>. . . | device 4A<br>none<br>none<br>. . . | device 2A<br>device 2A<br>device 1C<br>device 1C<br>. . . | N/A<br>N/A<br>N/A<br>N/A<br>. . . | N/A<br>N/A<br>N/A<br>N/A<br>. . . |

FIG. 3 account database 114

| | redundancy level | encryption key |
|---|---|---|
| Customer #1 | 2 | Key-1 |
| Customer #2 | 1 | Key-2 |
| Customer #3 | 3 | Key-3 |
| Customer #4 | 1 | Key-4 |

FIG. 4

| redundancy manager 115 | | device type | storage | % free |
|---|---|---|---|---|
| Customer #1 | 1A | NVR | 200GB | 20% |
| | 1B | Camera | 1GB | 10% |
| | 1C | Storage appliance | 50GB | 90% |
| Customer #2 | 2A | NVR | 50GB | 50% |
| Customer #3 | 3A | Camera | 20GB | 30% |
| | 3B | Camera | 20GB | 40% |
| Customer #4 | 4A | Camera | 10GB | 40% |

SYSTEM AND METHOD FOR DISTRIBUTED VIDEO STORAGE ACROSS ENTERPRISES

RELATED APPLICATIONS

This application claims the benefit under 35 USC 119(e) of U.S. Provisional Application No. 62/186,938, filed on Jun. 30, 2015, which is incorporated herein by reference in its entirety.

BACKGROUND OF THE INVENTION

Data storage is commonly offered as a cloud service. Business entities utilize cloud storage as a way of remotely storing data and as a tool for providing remote access to their data.

At the same time, surveillance camera systems are becoming increasingly common. These camera systems will usually include various types of cameras such as fixed cameras, e.g., wide field or fisheye lens cameras, and adjustable cameras, e.g., dome cameras and pan, tilt, zoom (PTZ) cameras. The image information (such as video clips or still images for series of still images) generated by the cameras can be stored locally on the cameras and/or stored in a common, typically local, repository such as a network video recorder (NVR).

In order to prevent data loss, business entities will sometimes store the image information generated by their surveillance camera systems in cloud storage systems. The same advantages of remote access and storage apply.

SUMMARY OF THE INVENTION

One problem with cloud storage of surveillance camera image information is cost. The amount of storage consumed by even a single camera can be costly on a monthly basis, or however periodically billed. These cloud storage systems are typically operated by third parties/separate business entities that charge for the storage on a subscription basis, with the periodic charges increasing with increased storage demands.

The present invention concerns a scheme to store image information, such as video clips or still images or series of still images, across multiple storage devices of different business entities. The advantages of redundancy and off-site storage are thus obtained, but possibly with lowered costs than those associated with traditional cloud storage systems. Instead, in examples, a peer-to-peer arrangement is used. Nevertheless, it is still possible for a user/customer to access the image information via a web portal hosted by their business entity or the operator of the system or access the image information from a mobile device.

In general, according to one aspect, the invention features a system for image information storage. The system comprises image information storage devices that are located in respective, different business entities. The devices store image information from one or more other business entities, i.e., business entities that are different from the business entity owner of the devices. One or more storage indexes indicate where image information is stored between the business entities and between the devices.

In embodiments, the image information storage devices include network video recorders and network cameras. Also, each of the image storage devices can include local storage in which image information is stored for the respective business entity and peer storage in which image information is stored from at least one other business entity. Typically, at least this peer storage is encrypted.

The image information can be transmitted between image information storage devices of different business entities using peer-to-peer connections. Also, the system can provide selectable levels of redundancy that are associated with and/or dictated by each of the business entities. The image information is then stored over higher numbers of other business entities/devices for higher levels of redundancy.

In general, according to another aspect, the invention features a method for image information storage. The method comprises storing image information storage generated at respective business entities to storage devices of other business entities and maintaining one or more indexes that indicate where image information is stored between the business entities.

In general, according to another aspect, the invention features an image information storage device. This device comprises image information storage, including local storage, in which locally-generated image information is stored, and peer storage, in which remotely-generated image information is stored. The device also has a peer-to-peer client for sending locally-generated image information to and receiving remotely-generated image information from other image information storage devices.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

It will be understood that although the terms "first" and "second" are used herein to describe various elements, these elements should not be limited by these terms. These terms are used only to distinguish one element from another element. Thus, an element discussed below could be termed a second element, and similarly, a second element may be termed a first element without departing from the teachings of the present invention.

As used herein, the singular forms and the articles "a", "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Figure 1:
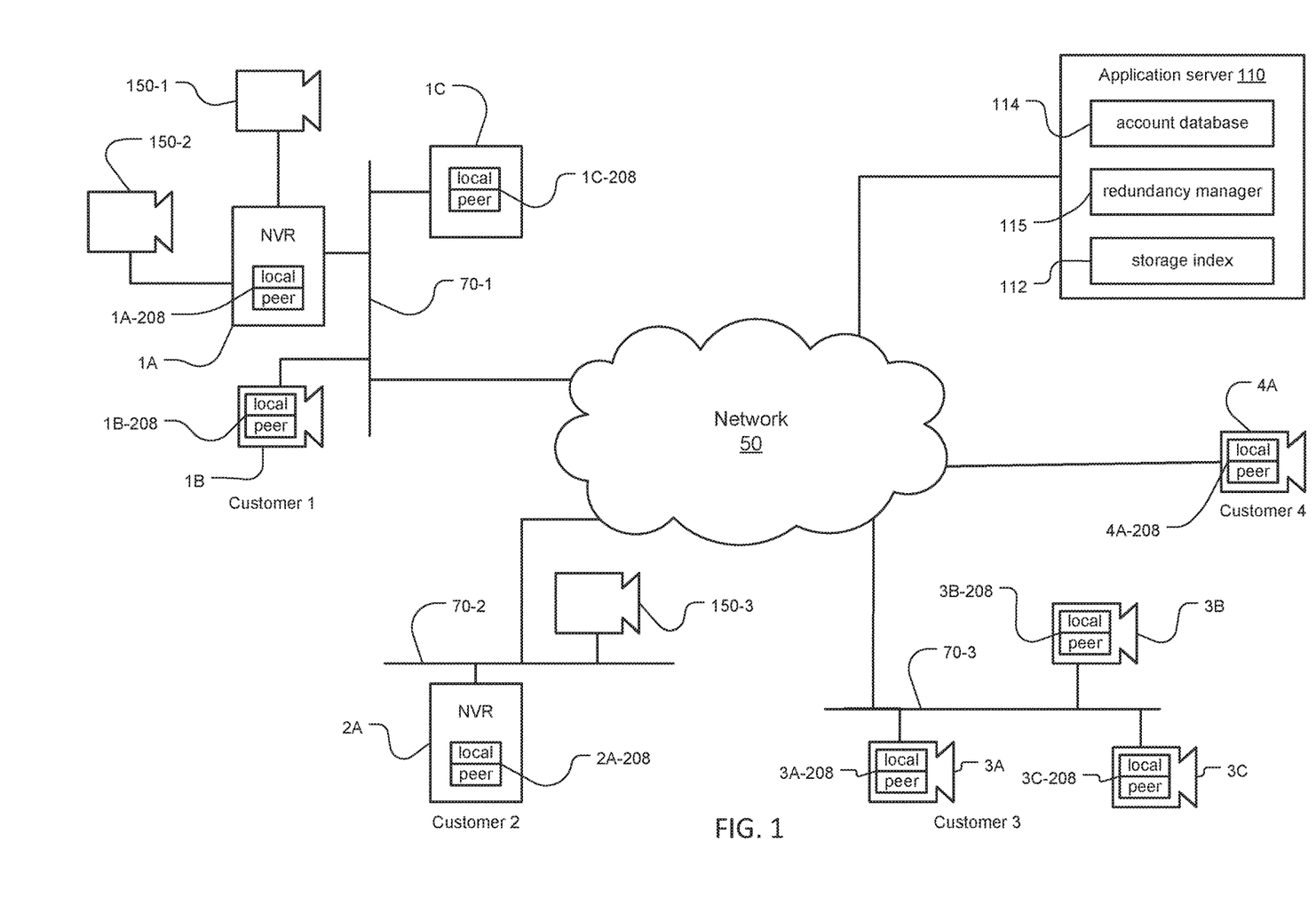
FIG. 1 is a schematic diagram of a distributed video storage system according to the present invention.

FIG. 1 shows a first embodiment of a distributed video storage system which has been constructed according to the principles of the present invention.

In general, the system enables storage to be shared across a number of different customers or business entities or across a number of different sites or building of the same business entity. In effect, the customers may store some of their image information generated by surveillance cameras locally on their network, and they may also store that image information on storage devices of other customers or business entities. This provides the benefit of allowing these customers or business entities to have the advantages associated with redundancy and off-site storage, on one hand, e avoiding the costs of transitional cloud storage systems, on the other.

In the illustrated example, several business entities, Customer 1, Customer 2, and Customer 3 and/or several different sites or building of the same customer, operate or have their own local area or enterprise networks 70-1, 70-2, and 70-3. On the other hand, Customer 4, which might be a small business, does not operate its own local area or enterprise network. These local area enterprise networks are usually characterized by their own private internet protocol (IP) address space using non-publically-routable IP addresses, following the standards set by RFC 1918 for Internet Protocol Version 4 (IPv4), and RFC 4193 for Internet Protocol Version 6 (IPv6).

Image information, such as video clips or still images, e.g., MPEG, JPEG or streaming PEG files, are stored locally on each customer's network (or on a single device, in the case of Customer 4). The image information is also stored in a redundant fashion on storage of other customers via the connectivity provided by the intra-enterprise network 50, such as the Internet and/or one or more network service provider networks.

In the specific example of Customer 1, the associated local area enterprise network 70-1 includes a number of different image information storage devices. For example, a network video recorder (NVR) 1A receives image information such as video clips from two connected, dedicated, surveillance cameras 150-1, 150-2. In one implementation, image information from these cameras is stored to the NVR's internal storage 1A-208. Also in the example, another surveillance camera 1B also contains its own onboard storage 1B-208. This allows the surveillance camera 1B to store at least some of the image information, such as video clips, that it generates. Also, on the network of Customer 1 70-1 is a storage appliance 1C that provides bulk data storage 1C-208.

In order to promote redundancy, in one example, the age information generated by surveillance cameras 150-1, 150-2 and surveillance camera 1B, which contains its own onboard storage, is distributed among the various storage assets on Customer 1's network 70-1, including storage 1A-208, 1B-208, and 1C-208.

In a similar vein, Customer 2 also has its own enterprise network 70-2. This includes a network surveillance camera 150-3, such as an internet protocol (FP) camera. Also on the network is an NVR 2A that has s own image information storage 2A-208.

Customer 3 has its associated network 70-3, which includes three surveillance cameras 3A, 3B, 3C. Each of these surveillance cameras in the illustrated example has its own onboard image information storage resource 3A-208, 3B-208, 3C-208, respectively.

Finally, Customer 4, possibly a small business with only a few employees, has a single surveillance camera 4A. This surveillance camera has its own image information storage 4A-208 and might be directly connected to the network 50, as shown.

In the illustrated example, in order to enable the different customers to share and distribute their image information for off-site and redundant storage, an application server 110 maintains a number of different databases or data stores that allow the image information from the different customers to be stored in a shared, communal fashion. Specifically, the application server 110 maintains an account database 114, a storage index 112, and a redundancy manager 115.

Figure 2A:
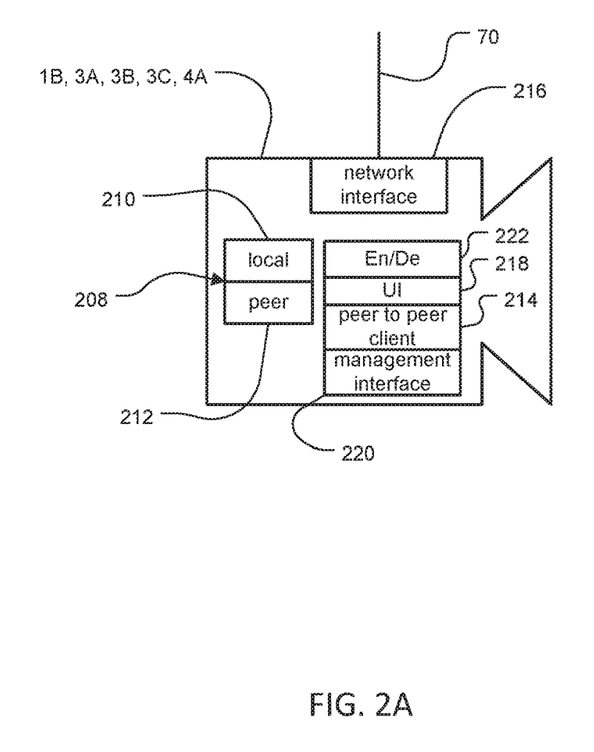
FIG. 2A is a block diagram of a camera network storage device according to the present invention.
Figure 2B:
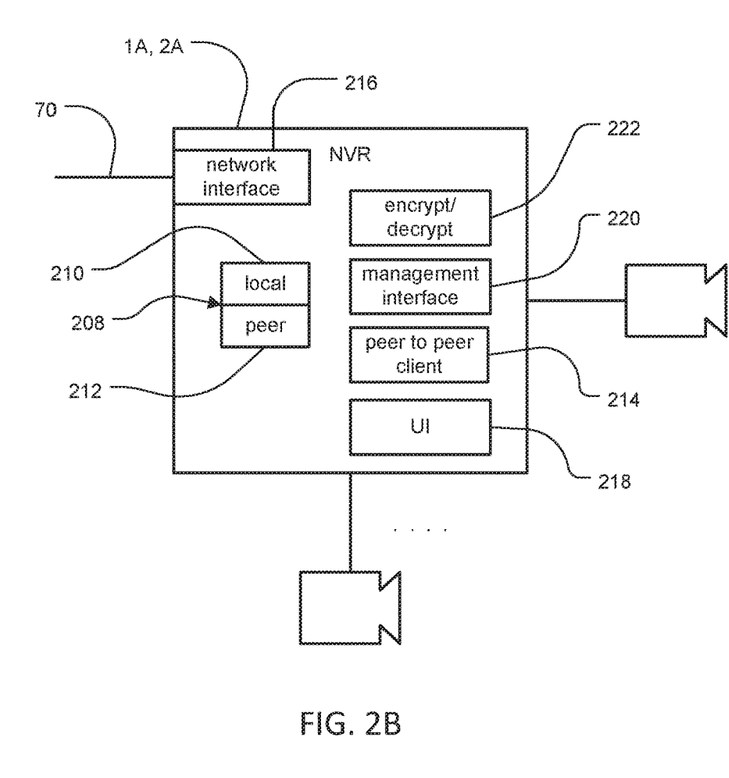
FIG. 2B is a block diagram of a network video recorder storage device according to the present invention.

FIGS. 2A and 2B illustrate the components of various image information storage assets. FIG. 2A shows an example of a surveillance camera that has onboard storage, such as surveillance cameras 1B, 3A, 3B, 3C, and 4A. FIG. 2B shows an example of a storage asset such as an NVR that provides dedicated storage and controls a number of surveillance cameras on the local enterprise network, such as NVR's 1A and 2A.

In either case, the local storage 208 is divided into local storage 210 and peer storage 212. The local storage 210 stores image information such as video clips that were generated by either the device itself, such as in the example of a surveillance camera with integrated storage, or image information that was typically generated on the local network of the business entity that owns the device.

So, in the example of Customer 1, the local storage 210 associated with surveillance camera 1B stores image information generated by itself (camera 1B) and possibly also stores image information generated by other cameras on network 70-1 of Customer 1, such as surveillance cameras 150-1, 150-2.

On the other hand, peer storage 212 contains image information, such as video clips, that were generated by other customers or business entities or by the same customer's devices but at a different building. For example, the peer storage 212 on Customer 1's storage assets, such as NVR 1A and/or surveillance camera 1B, stores image information from one or more of the other customers such as Customer 2, Customer 3, and/or Customer 4. In this way, each customer makes available some of its local storage for other business entities, in return for those other business entities' storing some of that customer's image information, thereby providing off-site storage and redundancy.

The image information storage assets also contain a network interface 216 for connecting to the local network 70 or directly to the inter-enterprise network 50. This interface can be wired or wireless.

The storage assets 1B, 3A, 3C, 4A, 1A, 2A also preferably each contain or have access to an encrypt/decrypt module 222, which can be a separate hardware compute resource or simply a process that executes on the device's processor. The encrypt/decrypt module 222 allows for the encryption of image information that is sent for storage to peer storage of another business entity and for decryption of any image information retrieved from peer storage of another business entity.

The image information storage assets 1B, 3A, 3B, 3C, 4A, 1A, 2A further have respective peer-to-peer clients 214 that enables the transfer of the image information through the network 50 to the storage assets of another business entity. This client will typically include a firewall punch-through capability to bypass any intervening firewalls or other security appliances. Finally, in some examples, each of the storage assets further include a user interface 218, such as an embedded HTML server that allows for the user access of the image information and a management interface 220 that allows for the user management of how the image information is stored.

Figure 3:
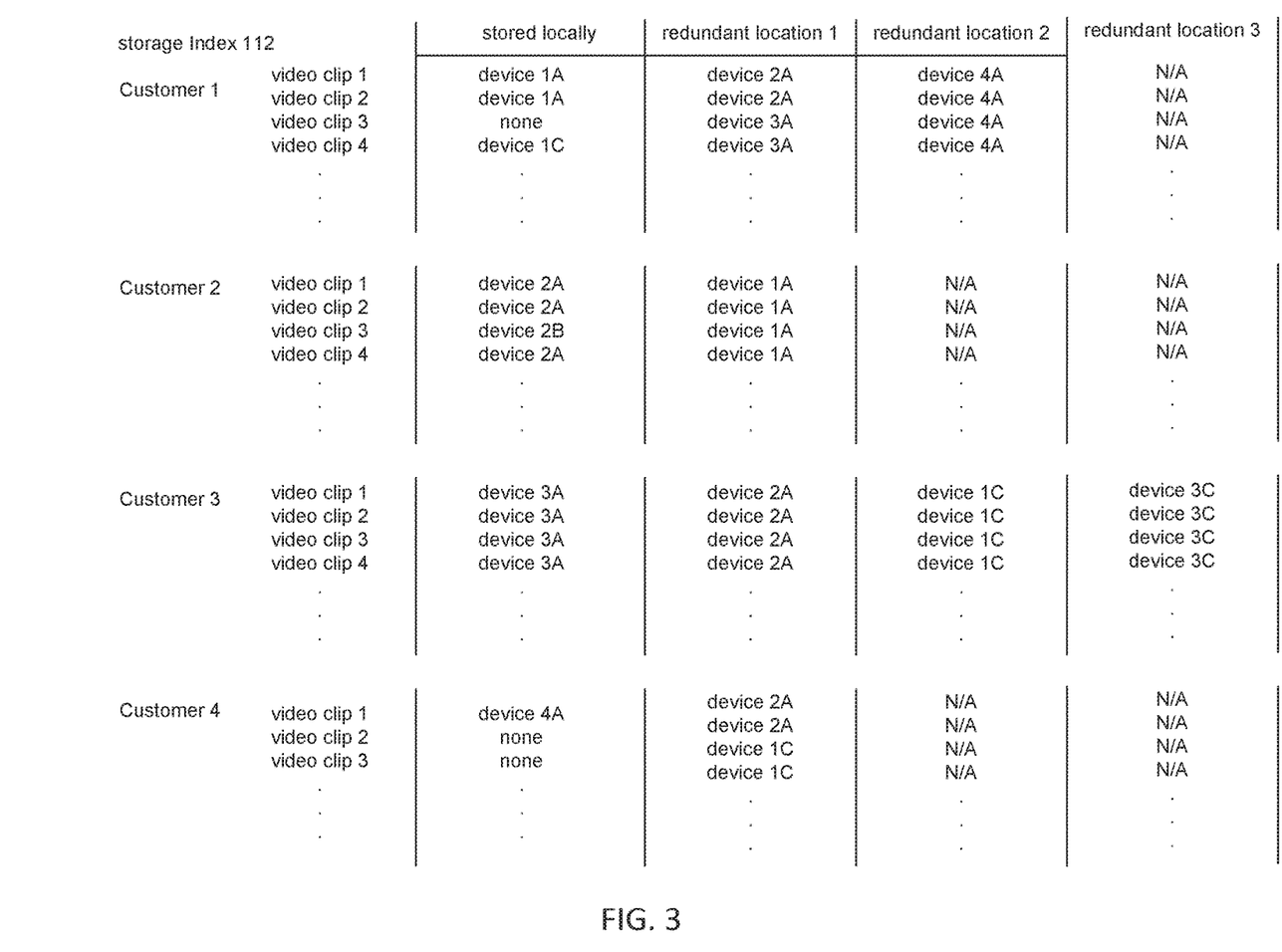
FIG. 3 is a schematic diagram showing aspects of the storage index.

FIG. 3 illustrates one embodiment of the storage index 112, which tracks the various locations in which image information, such as video clips, is stored.

As shown in FIG. 1, in one embodiment, the storage index 112 is maintained by a third party application server that is controlled by a service provider business entity other than Customers 1-4. However, in another example, the storage index 112 is maintained on a storage asset of each of Customers 1-4 for the image information of each of the respective customers.

Specifically, each of the customers Customer 1, Customer 2, Customer 3, and Customer 4, typically stores their respective image information, such as their own video clips 1-4 that were generated by the surveillance cameras installed at their respective premises or buildings, for example. In one example, one copy of these video clips is often stored locally. For example, video clip 1 and video clip 2 of Customer 1 are stored locally on storage device 1A.

In order to provide redundancy and off-site storage, however, these video clips 1-4 for Customer 1 are also stored into redundant locations. For example, video clip 1 is also stored in the peer storage of device 2A of Customer 2, and video clip 4 of Customer 1 is stored on surveillance camera 3A of Customer 3. In a similar vein, the video clips 1-4 of Customer 2 are all stored locally on storage assets of that customer, devices 2A, 2A, 2B, and 2A, respectively. Nevertheless, redundant storage is provided for those same video clips on device 1A of Customer 1.

Also illustrated is how different customers can subscribe or have the ability to have different levels of image information storage redundancy. For example, Customer 1 stores its image information locally and into two other redundant storage locations for each of the video clips 1-4. In contrast, Customer 2 has subscribed to a lower level of redundancy. Specifically, Customer 2 has its video clips stored locally and in only one other redundant location. In this example, they are stored mainly to the NVR of Customer 1. In the further example of Customer 3, its video clips are stored locally but also in three separate redundant storage locations: two of the locations are local (surveillance cameras 3A and 3C) and two are remote (NVR 2A and device 1C). Finally, Customer 4 stores some of its video clips locally on its sole surveillance camera 4A; however, each of the video clips 1-3 of Customer 4 are also stored on one redundant location, specifically devices 2A and 1C of Customers 2 and 1, respectively.

In this way, the image information is stored in multiple locations for each of these customers, across business entities. As a result, each customer merely incurs the added cost of having to support an incremental amount of peer storage on their local storage assets.

Figure 4:
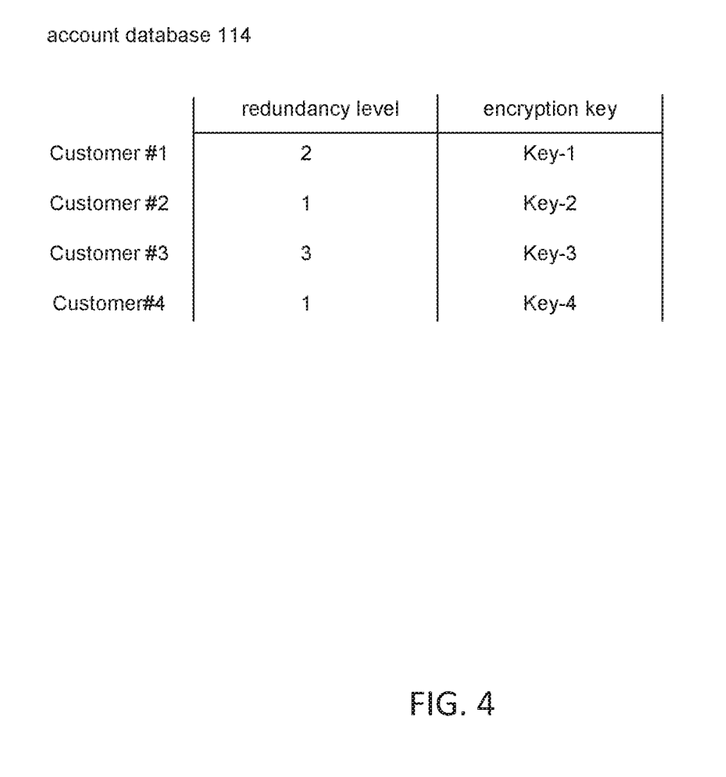
FIG. 4 is a schematic diagram showing aspects of the account database.

FIG. 4 illustrates some of the information maintained in the account database 114 for the application server 110. Specifically, for each customer there is a redundancy level that is associated with the amount of redundancy that each customer has elected. For example, Customer 1 has a redundancy level of 2, which corresponds to their image information being stored in two off-site storage locations, whereas Customer 3 has elected to have a higher level of redundancy: 3. In this case, the image information for Customer 3 is stored in three redundant storage locations.

The account database 114 also stores the encryption key utilized by each of the customers 1-4, In the preferred embodiment, the image information that is stored in the peer storage of another customer is encrypted. In the illustrated example, the corresponding encryption keys are stored by the application server 110. Although in other embodiments, the encryption key is only held by the customer for that customer's image information.

Figure 5:
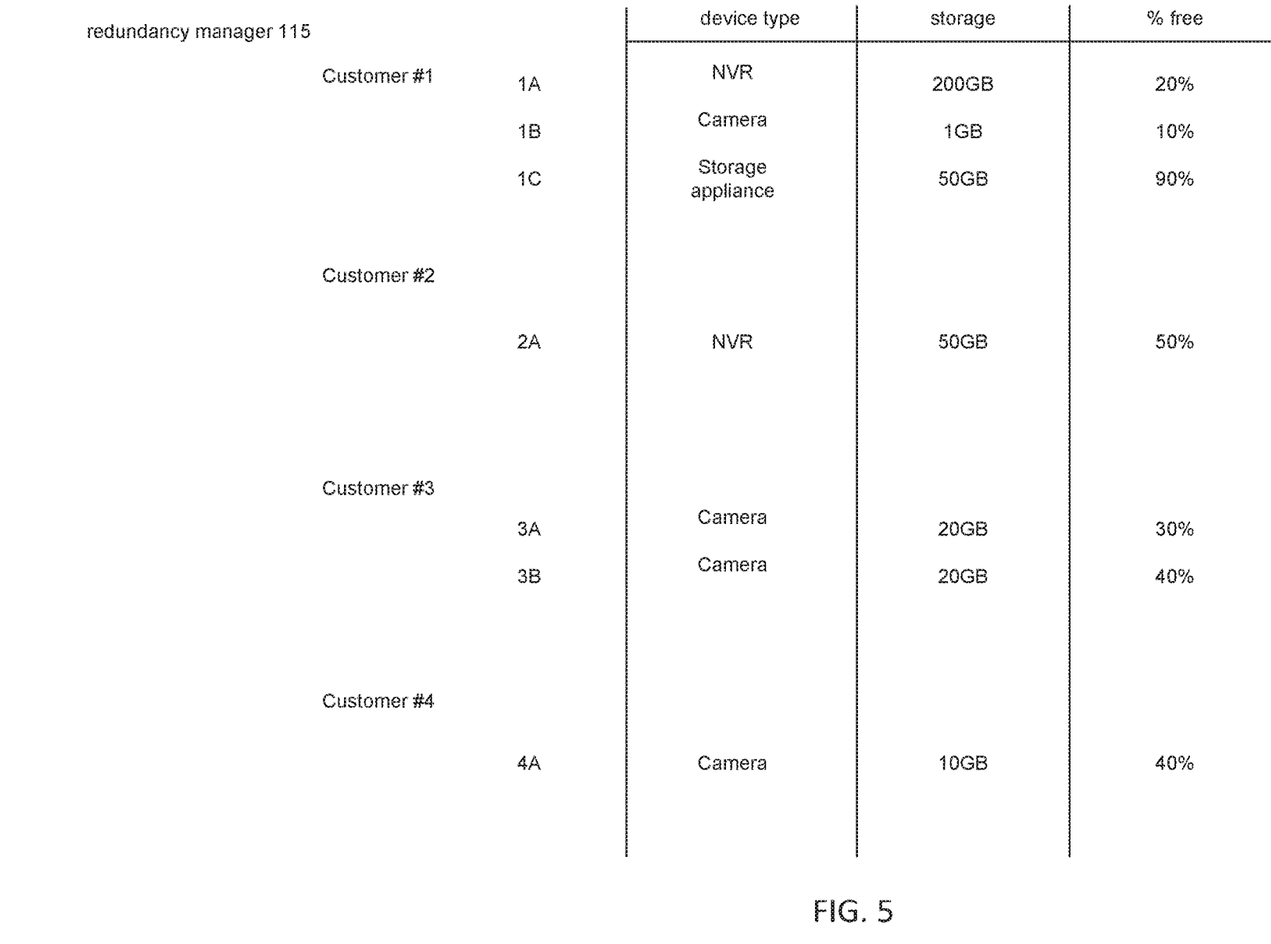
FIG. 5 is a schematic diagram showing the redundancy manager.

FIG. 5 illustrates some of the information maintained in the redundancy manager 115. In the illustrated embodiment, the redundancy manager 115 maintains information concerning the storage assets of each of the customers 1-4. For example, in the illustrated example, it maintains the device type for each of the storage assets 1A, 1B, 1C for Customer 1. The storage manager 115 further maintains the storage capacity for each of these devices along with the amount of free storage for each of the storage assets. In this way, the application server 110 can distribute the redundant storage required by each of the customers to the peer storage of other customers.

Figure 6:
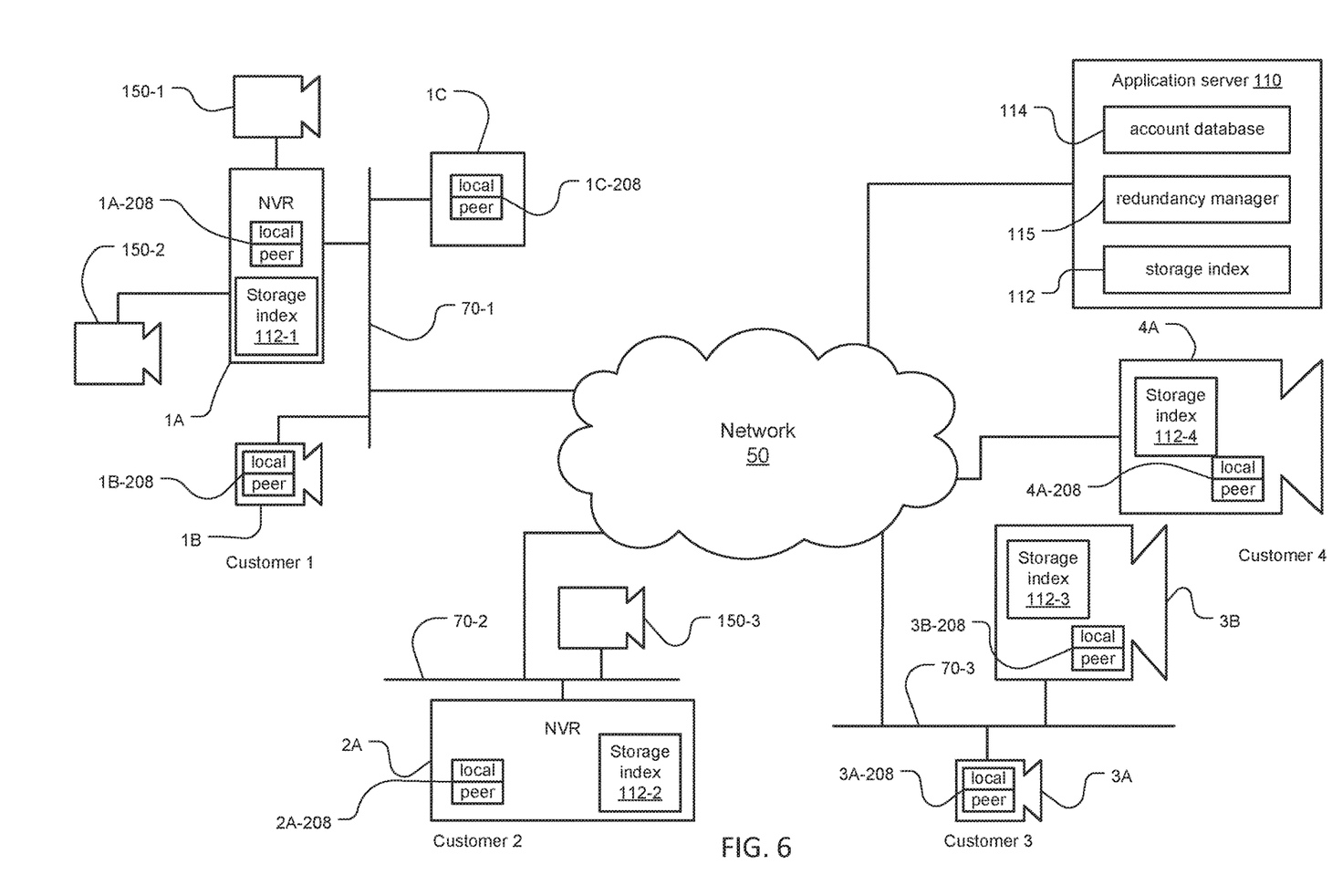
FIG. 6 is a schematic diagram of a distributed video storage system according to another embodiment.

FIG. 6 illustrates still another embodiment. In this example, the storage index is either alternatively maintained or additionally maintained locally by the customers. Specifically, the NVR 1A further maintains its own storage index 112-1. This storage index is similar to that maintained by the application server 110. Specifically, the storage index indicates the redundant storage locations for each of the video clips of Customer 1 and where those video clips are stored in peer storage of the other customers. The advantage of this system is that if the application server 110 is unavailable or if the customers wish to directly negotiate between each other as to how the video image information is stored redundantly, the index information can be stored locally for each of the customers on their respective local networks 70.

While this invention has been particularly shown and described with references to preferred embodiments thereof, it will be understood by those skilled in the art that various changes in form and details may be made therein without departing from the scope of the invention encompassed by the appended claims.

What is claimed is:

1. A system for image information storage, comprising:
image information storage devices that are located in respective customer business entities that store image information from other customer business entities; and
one or more storage indexes that indicate where image information is stored between the customer business entities, wherein the one or more storage indexes are maintained by a service provider business entity that provides services to the customer business entities; and
wherein each of the image storage devices include local storage in which image information is stored for the respective customer business entity and peer storage in which image information is stored from at least one other customer business entity, and each of the image storage devices further have respective peer-to-peer clients that enable the transfer of the image information to the image storage devices owned by the at least one other business entity, the peer-to-peer clients including firewall punch-through capabilities to bypass any intervening firewalls and user interfaces including embedded HTML servers that allow for user access of the image information and a management interface that allows for user management of how the image information is stored.

2. The system as claimed in claim 1, wherein the image information storage devices include network video recorders and network cameras.

3. The system as claimed in claim 1, wherein the peer storage is encrypted.

4. The system as claimed in claim 1, wherein image information is transmitted between image information storage devices of different customer business entities using peer-to-peer connections.

5. The system as claimed in claim 1, wherein selectable levels of redundancy are associated with the business entities, and image information is stored over higher numbers of other customer business entities for higher levels of redundancy.

6. The system as claimed in claim 1, further comprising an application server that maintains the one or more storage indexes.

7. The method as claimed in claim 6, wherein the one or more storage indexes are maintained in the image information storage devices.

8. The system as claimed in claim 1, wherein selectable levels of redundancy are associated with the customer business entities, and image information is stored over higher numbers of other customer business entities for higher levels of redundancy, including storing the image information in two other customer business entities.

9. The system as claimed in claim 1, further comprising an encrypt/decrypt module that performs encryption of the image information that are sent for storage to the peer storage of the at least one other business entity and for decryption of the image information retrieved from the peer storage of the at least one other business entity.

10. A method for image information storage, comprising:
storing image information generated at respective customer business entities to storage devices of other customer business entities; and
maintaining one or more storage indexes that indicate where image information is stored between the customer business entities, wherein the one or more storage indexes are maintained by a service provider business entity that provides services to the customer business entities;
wherein each of the storage devices include local storage in which image information is stored for the respective customer business entity and peer storage in which image information is stored from at least one other customer business entity, and each of the storage devices further have respective peer-to-peer clients that enable the transfer of the image information to the storage devices owned by the at least one other business entity, the peer-to-peer clients including firewall punch-through capabilities to bypass any intervening firewalls and user interfaces including embedded HTML servers that allow for user access of the image information and a management interface that allows for user management of how the image information is stored.

11. The method as claimed in claim 10, further comprising storing the image information to network video recorders and network cameras.

12. The method as claimed in claim 10, further comprising encrypting the remotely-generated image information.

13. The method as claimed in claim 10, wherein image information is transmitted between different customer business entities using peer-to-peer connections.

14. The method as claimed in claim 10, further comprising enabling selectable levels of redundancy associated with the customer business entities, and storing image information to higher numbers of other customer business entities for higher levels of redundancy.

15. The method as claimed in claim 10, further comprising maintaining the one or more storage indexes in an application server.

16. The method as claimed in claim 10, wherein the one or more storage indexes are maintained in the image information storage devices.

17. A system for image information storage comprising:
a network;
surveillance cameras connected by the network, each of the surveillance cameras having onboard storage, which is divided into local storage and peer storage, wherein the local storage stores video clips that were generated by the surveillance cameras themselves and that were generated on a local network of a business entity that owns the surveillance cameras, wherein the peer storage contains video clips that were generated by other business entities, such that each of the business entities makes available some of its local storage for other business entities, in return for those other business entities storing some of that image information, thereby providing off-site storage and redundancy, wherein each of the surveillance cameras further comprises an encrypt/decrypt module that performs encryption of the video clips that are sent for storage to peer storage of another business entity and for decryption of the video clips retrieved from peer storage of another business entity, wherein each of the surveillance cameras further have respective peer-to-peer clients that enable the transfer of the video clips through the network to the onboard storage of surveillance cameras owned by another business entity, the peer-to-peer clients including firewall punch-through capabilities to bypass any intervening firewalls and user interfaces including embedded HTML servers that allow for user access of the video clips and a management interface that allows for the user management of how the image information is stored, wherein the surveillance cameras each further include storage indices that track locations in which the video clips are stored to store the video clips into redundant locations with the video clips being stored in peer storage of at least two different further business entities, and wherein the system provides different levels of image information storage redundancy, whereby video clips are stored locally and into two other redundant storage locations owned by at least two other business entities.

* * * * *